July 22, 1958     L. W. DEETER     2,844,383
BOAT CARRIER HAVING INDIVIDUALLY SUSPENDED WHEELS
Filed May 25, 1955

INVENTOR.
LESTER W. DEETER.
BY
ATTORNEY

United States Patent Office 2,844,383
Patented July 22, 1958

2,844,383

BOAT CARRIER HAVING INDIVIDUALLY SUSPENDED WHEELS

Lester W. Deeter, Reading, Pa.

Application May 25, 1955, Serial No. 510,883

2 Claims. (Cl. 280—124)

This invention relates to a boat carrier and, more particularly, to a jack-type boat carrier or push cart in the form of a wheeled cradle or cart for suspending a boat so that it may be easily transported overland, manually for short distances, such as from a bungalow to a lake or to move boats at a boating concession.

An outstanding disadvantage of boat trailers of conventional construction is that they are of relatively complicated and expensive construction, requiring special parts and special wheels and generally including long forward extensions and hitches which add even more to the expense and complication of such constructions. A still further disadvantage is that most conventional trailers or wheel carts do not have spring mountings, or at least suitable and practical spring mountings, and as a consequence they transmit shocks to the boat as the result of rough roads, thereby tending to loosen the parts of the carrier and damage those of the boat.

An object of my invention is to provide a novel jack-type boat carrier in the form of a wheeled cradle or cart which is devoid of the above named disadvantages, which is of relatively simple and inexpensive construction and which utilizes, to a very high degree, standard bicycle parts, therefore which enables the construction thereof at home by the average individual, thus reducing the cost thereof to ¼ of that of conventional trailers, also which can be packed in a flat space, be taken apart or assembled in less than five minutes, and which can be used to carry logs in the same manner as a boat or carry dirt, fruit, etc. by suspension in baskets or boxes from the cross frame.

Another object of my invention is to provide a novel wheeled cradle or cart involving a novel type spring suspension for resiliently suspending a boat therefrom so as to prevent transmission of shocks resulting from irregular surfaced roadways.

Other objects and advantages of the present invention will become more apparent from a study of the following description taken with the accompanying drawing wherein.

Figure 1:
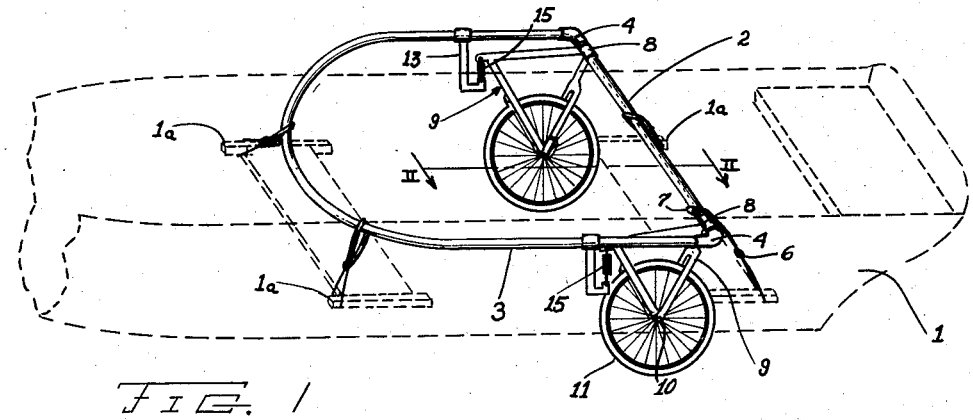
Figure 1 is a perspective view of a jack-type boat carrier embodying the principles of my invention.
Figure 2:
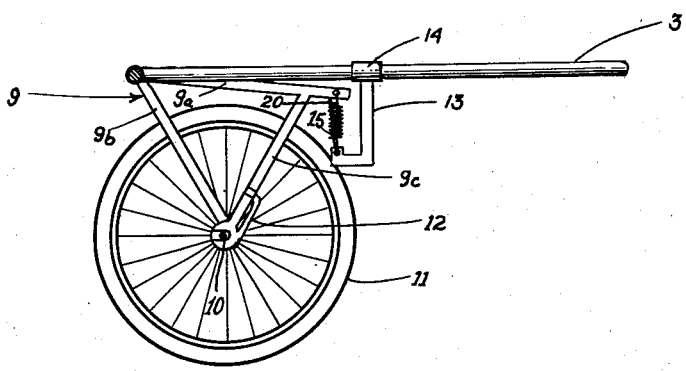
Figure 2 is a side view, partly in section, of one of the side frames and wheels, taken along line II—II of Figure 1.
Figure 3:
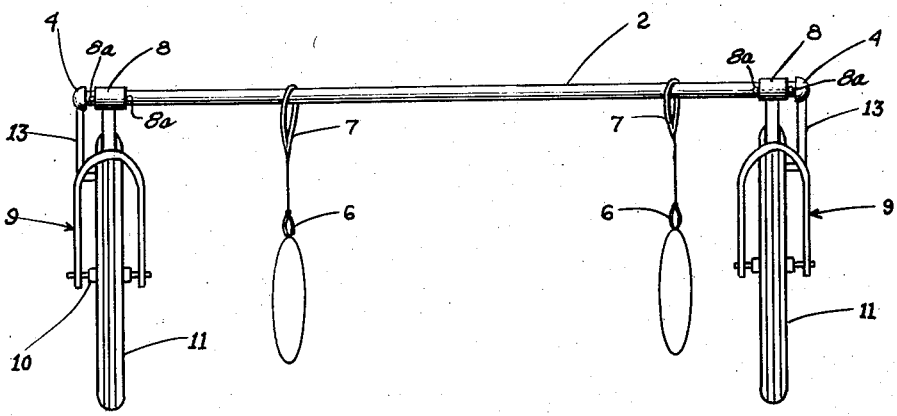
Figure 3 is a rear view of the construction shown in Figure 2.

Referring more particularly to Figure 1 of the drawing, numeral 1 denotes a boat which is to be carried overland and which is provided with eyelets or loop fastening brace elements 1a secured at spaced intervals on the top or inside thereof. Numeral 2 generally denotes a portion of the main frame comprising an axle forming straight pipe 2, extending along the rear of the framework, the ends of which pipe are secured to a substantially semicircular pipe or handle 3 by means of a pair of elbows 4 in which the ends of the respective pipes are slipped in and pinned. Pipe 2 may be a 1" pipe and pipe 3 a ¾" pipe, or of any other suitable size, and made of steel or aluminum or other suitable material.

Suspended from pipes 2 and 3 are a plurality of hooks 6 suspended by loops 7 which encircle the pipes, which hooks are adapted to be fastened to the eyelets or support elemenst 1a so as to suspend the boat from pipes 2 and 3 of the main frame. It will be noted that the loops 7 may be slid along the respective pipes so as to adjust their spacing to accommodate different boat sizes and widths.

At the end portions of pipes 2 there are journaled a pair of sleeve bearings 8, each of which is integral with a forked side frame 9, comprising substantially triangularly arranged forked braces 9a, 9b and 9c of a construction of the rear frame of a bicycle, which support an axle 10 which mounts an ordinary bicycle wheel 11. Most of the side frame construction and the bicycle wheel 11, together with standard arms 12, are of standard construction and form the rear wheel assembly of an ordinary bicycle.

Lateral sliding movement of sleeve bearings 8 is prevented by cotter pins 8a. It will be apparent that the side frames 9 are pivotally mounted at the upper rear corners of the inverted triangle formed thereby so as to permit pivotal movement of the wheels and side frames about the axis of pipe 2 as a center. This pivotal movement is yieldably resisted by a spring mounting comprising spring supports 13 which are rigidly secured to opposite portions of the pipe 3 by means of couplings 14, and having secured to the depending end of the respective supports, one end of tension springs 15, the other end of each of said springs is secured to the forward corners of side frames 9. Thus, as the boat load is applied to pipes 2 and 3, the forward corners of side frames 9 will tend to rise, thereby tensioning springs 15 so as to yieldably resist their movement, cushion the suspension and prevent transmission of shocks.

In operation, assume that the boat is on the ground. Handle 3 of the carrier is grasped by the operator and lifted so as to lower pipe 2 sufficiently so as to almost meet the top of the boat to enable hooking of the hooks 7, suspended from pipe 2, onto elements 1a at the rear of the boat. By thereafter lowering the handle, the rear end of the boat is lifted with very little manual effort because of the leverage of handle 2. The elements 1a at the forward end of the boat are then secured to hooks 7 suspended from pipe 3. The boat is now suspended from the carrier or cart and may be wheeled on a roadway surface by either manually pulling the bow end of the boat or by pulling on pipe 3.

The boat may be unhooked by a similar procedure and the carrier may be easily wheeled about by handle 2.

As the boat is wheeled over rough roads and as the inertia of the boat causes relative lowering thereof relative the main frame, the forward corners of side frames 9 are pivotally lifted about pipe 2 as a center, resisted by the tension springs 15 so as to provide a very soft, cushioned and shock-proof ride for the boat.

Thus it will be seen that I have provided a jack-type boat carrier in the form of a wheeled cradle or cart, which is of such construction as to yieldably suspend a boat and thus prevent transmission of shocks to the carrier and boat as the result of irregular roadway surfaces; furthermore I have provided a boat carrier which is made substantially of standard bicycle parts, particularly the rear frame and wheel construction of a conventional bicycle, therefore enabling assembly of the carrier by the ordinary individual from available parts instead or requiring the purchase of special parts which would add considerably to the expense of the construction; furthermore I have provided a boat carrier which may be easily wheeled about and easily attached to the boat, so as to enable mounting it on the carrier with exertion of very little manual effort; furthermore, I have provided a carrier which enables easy wheeling of a suspended boat by the mere grasping of the handle of the corner and bow portion of the boat, whereby the boat may be drawn manually either uphill or downhill; furthermore I have provided a boat carrier in which the wheel assembly including the side frames may be detached so as to enable packing of the entire carrier assembly in a shipping crate having very small width (substantially that of the side frames); furthermore I have provided a boat carrier of such construction that it may remain mounted on the boat even when the boat is in the water, since a passenger may sit within the central portion of the loop formed by pipes 2 and 3, therefore eliminating the necessity for removal of the carrier when going into the water or mounting when leaving the water.

As a modification, and to prevent abnormal tensioning of the helical springs 15, chains 20 may be inserted therethrough so as to extend along the axis of the springs, with ends fastened to the terminals of the springs so that after predetermined tensioning and elongation of the springs, the chains will be extended to normal length to act as stops to prevent further elongation of the springs.

While I have illustrated and described one embodiment of my invention, it will be understood that this is by way of illustration only, and that various changes and modifications may be made within the contemplation of our invention and within the scope of the following claims.

I claim:

1. A boat carrier comprising a plurality of pipe portions detachably connected together in the form of a closed loop extending in a horizontal plane, said portions comprising a straight, transversely extending, axle forming portion and a U-shaped portion whose extremities are connected to the ends of said axle-forming portion, suspension means supported by said U-shaped and straight portions for attachment to inside parts of the boat, a pair of triangular side frames extending downwardly at right angles to said loop, each frame including two downwardly converging forked sections terminating in a bearing, a bicycle wheel mounted on each bearing, the top ends of the rearmost of said sections having sleeve bearings journaled to the end portions of said straight portion, a pair of hangers depending from the legs of said U-shaped portion, a pair of springs for yieldably resisting pivotal movements of said side frames about said straight pipe section as on axis, each spring having one end connected to one of said hangers and the other end connected to the foremost corner of one of said triangular side frames, whereby a spring suspension is provided for the boat and whereby the parts of said carrier may be easily disassembled and stored in a space having very small width.

2. A boat carrier as recited in claim 1 wherein said springs are in the form of helical springs, and wherein a chain is extended along the axis of each helical spring and having ends connected to the ends of said springs for limiting the amount of extension of said springs.

References Cited in the file of this patent

UNITED STATES PATENTS

| | | |
|---|---|---|
| 2,388,870 | Sackett | Nov. 13, 1945 |
| 2,525,506 | Wiedman | Oct. 10, 1950 |
| 2,549,320 | Makin | Apr. 17, 1951 |
| 2,634,010 | Sass | Apr. 7, 1953 |
| 2,650,099 | Keaton | Aug. 25, 1953 |
| 2,657,934 | Linneman | Nov. 3, 1953 |
| 2,719,726 | Johnston | Oct. 4, 1955 |

FOREIGN PATENTS

| | | |
|---|---|---|
| 930,414 | France | Aug. 11, 1947 |